United States Patent
Garcia, Jr. et al.

(10) Patent No.: US 8,014,272 B2
(45) Date of Patent: Sep. 6, 2011

(54) SYSTEM AND METHOD FOR DATA SCRAMBLING TO REDUCE THE CREST FACTOR IN AN OFDM WAVEFORM

(75) Inventors: Salvador Garcia, Jr., Redmond, WA (US); Eamonn Gormley, Seattle, WA (US); Elliott Hoole, Redmond, WA (US)

(73) Assignee: AT&T Mobility II LLC, Atlanta, GA (US)

( * ) Notice: Subject to any disclaimer, the term of this patent is extended or adjusted under 35 U.S.C. 154(b) by 0 days.

(21) Appl. No.: 12/419,392

(22) Filed: Apr. 7, 2009

(65) Prior Publication Data

US 2009/0202012 A1 Aug. 13, 2009

Related U.S. Application Data

(63) Continuation of application No. 10/929,732, filed on Aug. 30, 2004, now Pat. No. 7,539,172, which is a continuation of application No. 09/590,004, filed on Jun. 8, 2000, now Pat. No. 6,785,258.

(60) Provisional application No. 60/140,648, filed on Jun. 23, 1999.

(51) Int. Cl.
*H04J 11/00* (2006.01)
*H04B 2/208* (2006.01)
*H04Q 11/02* (2006.01)
*H04L 27/28* (2006.01)

(52) U.S. Cl. ........ 370/208; 370/344; 370/430; 375/260; 455/552.1

(58) Field of Classification Search .................. 370/344, 370/468, 394, 367, 525, 430, 203, 208; 455/552.1; 375/260
See application file for complete search history.

(56) References Cited

U.S. PATENT DOCUMENTS

| 5,381,449 A | 1/1995 | Jasper et al. |
| 5,636,247 A | 6/1997 | Kamerman et al. |
| 5,642,384 A | 6/1997 | Ramesh |

(Continued)

FOREIGN PATENT DOCUMENTS

WO 9929078 A2 6/1999

(Continued)

OTHER PUBLICATIONS

Van Eetvelt, P. E Tal., "Peak to Average Power Reduction for OFDM Schemes by Selective Scrambling", Electronics Letters, Oct. 10, 1996, pp. 1963-1964, vol. 32, No. 21, Stevenage, United Kingdom.

(Continued)

*Primary Examiner* — Ronald Abelson
(74) *Attorney, Agent, or Firm* — Zagorin O'Brien Graham LLP (57) ABSTRACT

A method is provided for minimizing the peak power level in a combination of orthogonal frequency division multiplexed (OFDM) tones. The method is particularly effective when the information to be communicated is digital data consisting of long patterns of "1"s or "0"s. The digital data of the message is combined with a scrambling vector before the data is modulated. The randomization of data patterns, in turn, leads to a more random combination of OFDM tone amplitude being transmitted. The message is recovered at the receiver by removing the scrambling vector. A table of scrambling vectors is maintained at the transmitters and receivers. The table pointer to select the scrambling vector is selected in response to the position of the message in the communication structure. An OFDM communication system using the above-described method is also provided.

16 Claims, 7 Drawing Sheets

U.S. PATENT DOCUMENTS

| | | | |
|---|---|---|---|
| 5,652,772 | A | 7/1997 | Isaksson et al. |
| 5,732,359 | A | 3/1998 | Baranowsky et al. |
| 5,835,602 | A | 11/1998 | Lang |
| 5,970,053 | A | 10/1999 | Schick et al. |
| 6,005,876 | A | 12/1999 | Cimini, Jr. et al. |
| 6,125,103 | A | 9/2000 | Bauml et al. |
| 6,175,551 | B1 | 1/2001 | Awater et al. |
| 6,208,669 | B1 | 3/2001 | Cimini et al. |
| 6,314,146 | B1 | 11/2001 | Tellado et al. |
| 6,333,937 | B1 | 12/2001 | Ryan |
| 6,522,700 | B1 * | 2/2003 | Zimmermann et al. ...... 375/295 |
| 6,556,557 | B1 | 4/2003 | Cimini et al. |
| 6,785,258 | B1 | 8/2004 | Garcia, Jr. et al. |
| 2004/0100897 | A1 | 5/2004 | Shattil |
| 2005/0073945 | A1 | 4/2005 | Garcia, Jr. et al. |

FOREIGN PATENT DOCUMENTS

| | | | |
|---|---|---|---|
| WO | WO99/29078 | | 6/1999 |
| WO | 9933271 | A1 | 7/1999 |
| WO | WO99/33271 | | 7/1999 |
| WO | WO 99/52302 | * | 10/1999 |

OTHER PUBLICATIONS

U.S. Appl. No. 10/929,732, filed Aug. 30, 2004 entitled "System and Method for Data Scrambling to Reduce the Crest Factor in an OFDM Waveform," naming inventors Salvador Garcia, Jr., Eamonn Gormley and Elliott Hoole.

PCT, Notification of Transmittal and International Search Report for PCT/US 00/15836, Mailed Oct. 11, 2000, 7 pages.

Ho, T.F., et al., "Construction of Spectrally Efficient Low-Crest Waveforms for Multicarrier CDMA Systems", International Conference on Universal Personal Communications, IEEE, Nov. 6, 1995, pp. 522-526, New York, USA.

* cited by examiner

SYSTEM AND METHOD FOR DATA SCRAMBLING TO REDUCE THE CREST FACTOR IN AN OFDM WAVEFORM

RELATED APPLICATIONS

This application is a continuation of co-pending U.S. patent application Ser. No. 10/929,732, filed Aug. 30, 2004, entitled "System and Method for Data Scrambling to Reduce the Crest Factor in an OFDM Waveform," naming Salvador Garcia, Jr. et al. as inventors, which is a continuation of U.S. patent application Ser. No. 09/590,004, filed on Jun. 8, 2000, now U.S. Pat. No. 6,785,258, entitled "System and Method for Data Scrambling to Reduce the Crest Factor in an OFDM Waveform," naming inventors Salvador Garcia, Jr. et al., which claims the benefit of U.S. Provisional Application No. 60/140,648, filed Jun. 23, 1999, entitled "Method for High Speed Data Communications in a Personal Wireless Network," which applications are hereby incorporated by reference.

BACKGROUND OF THE INVENTION

This invention relates generally to communication systems and, more particularly, to a technique which minimizes the transmitted peak power levels in an orthogonal frequency division multiplexed (OFDM) waveform by randomizing the digital data being communicated.

The frequency tones transmitted in an OFDM system are purposely spaced so that the frequency components of the tones are non-additive. That is, multiple tones can be received in a wideband receiver without a first tone canceling out or adding to the amplitude of neighboring tones. This permits the communication system to transmit and receive tones simultaneously, without mutual interference. However, these orthogonal frequency components still interact (are additive) with each other from the perspective of time domain analysis.

In the exemplary OFDM system described in Provisional Application Ser. No. 60/140,648, many orthogonal frequency tones are transmitted or received simultaneously. These tone frequency sums are ultimately communicated by base stations and remote units through a wired or radio frequency (RF) link using power amplifiers and receivers. At any one instant, the waveform being transmitted by a power amplifier is a voltage which is a sum of the voltages of the tones. If the phase relationship between tones is random, then the peak voltage falls within a well defined range. For example, with 288 tones of equal magnitude, but random phases, the peak voltage in the time domain OFDM waveform is distributed in the range of 8 dB to 14 dB above the RMS voltage level, but may be as high as 27 dB above it when the phases align. This large peak voltage is known as "cresting" of the OFDM waveform.

The OFDM system requires a high degree of linearity in the communication of the OFDM tones. Non-linear transmission or reception of a first signal generates harmonic and spurious products which have a frequency relationship to the first signal. In a system that depends on frequency orthogonality, the non-linear communication of tones will generate tone products which act to destroy this relationship of orthogonality. Alternately stated, in an OFDM system which relies upon the amplitude components of the tones to relay information, it is critical that the amplitude information is not degraded in the amplification process. Thus, in an OFDM system it is necessary to use linear power amplifiers to transmit the OFDM waveform.

As is well known in the art, the bias on these types of amplifiers (Class A) must be set especially high. Class A amplifiers draw a great deal of current regardless of the RMS value of the actual power being transmitted. The amount of power drawn by a Class A amplifier is proportional to the peak voltage that the amplifier must be capable of amplifying. It is therefore desirable to keep expected peak waveform voltage to a minimum. This permits a linear amplifier with a minimum dynamic range to be used, without clipping the OFDM waveform and thus causing non-linearities. This also minimizes the power consumption of the hardware, which extends the life of the equipment, and in the case of battery powered devices, such as remote units, extends the life of the batteries.

These same problems are a concern in the design of the receiver. Although receivers do not generally consume a great of deal power, as compared to the power amplifier, dynamic range is critical. The receiver must have a dynamic range large enough to recover a transmitted signal at a large range of input power levels, where the strength of the received signal corresponds to the distance between the receiver and transmitter.

In the OFDM system, digital data is modulated using QAM, QPSK, PSK, or other schemes, as are well known in the art. These modulation systems rely on the amplitude and/or phase of a symbol to convey information. Ultimately, the phase and/or amplitude of the OFDM tone is used for communication of information. In voice communications, and in many data communications, the information and, therefore, the patterns of digital data representing the information are random. The random pattern of digital data translates through the modulation process into a random selection of tone phases and amplitudes. When this random collection of OFDM tone frequencies are transmitted simultaneously, it is statistically unlikely that they will add to create a very large peak in the time domain OFDM signal. In this situation, there is no need to be concerned with saturating an OFDM power amplifier designed to operate in this scenario. Saturation of the power amplifier due to a large peak voltage is more likely to occur when the digital data to be communicated is highly correlated or the same, for example, when information is being sent that represents an image with a highly uniform background. Then, the data consists of a long pattern of "0"s or "1"s. In this circumstance, where the digital data forms a repetitious pattern, it is likely that the OFDM tones will have a highly correlated phase and amplitude relationship. This correlation of the phase leads to a large peak in the OFDM waveform. In order to handle this large peak without clipping the OFDM waveform, the power amplifier must operate in a larger dynamic range than the range resulting from a random combination of tone amplitude and phases. Operation in a large dynamic range results in the power amplifier consuming more power.

It would be advantageous if the peak power levels required for transmission in an OFDM communication system could be kept to a minimum to preserve linearity, reduce power consumption, and simplify the design of the transmitter and receiver.

It would be advantageous if the dynamic range of the power levels required for transmission in an OFDM communication system could be minimized to avoid clipping in the power amplifier and to reduce power consumption.

SUMMARY OF THE INVENTION

Accordingly, a method for minimizing the peak voltage of the tones in an OFDM communication is provided. The method comprises a transmitter accepting a message including digital data; randomizing digital data patterns in the message, and so creating a randomized message; mapping the randomized message into OFDM tones; and transmitting the OFDM tones. Likewise, the method further comprises a receiver which essentially reverses the process: receiving the transmitted OFDM tones; de-mapping the received OFDM tones into the randomized message; de-randomizing the pattern of digital data in the message; and receiving the message.

The randomizing or de-randomizing of the message includes combining the digital data with a predetermined scrambling vector. The scrambling vector is a pseudo-random arrangement of digital data, which is either combined or removed from the digital data by using an exclusive- or process.

A plurality of scrambling vectors are provided, and the method further comprises selecting a first scrambling vector; using the first scrambling vector, randomizing the pattern of digital data in the message; and using the first scrambling vector, de-randomizing the pattern of digital data in the message.

A system for the communication of orthogonal frequency division multiplexed (OFDM) tones having a minimized peak power level is also provided. The system comprises a base station and at least one remote unit. Both the base stations and remote units have transmitters to accept a message including digital data. Each transmitter includes a scrambler to randomize the pattern of digital data in the message, a modulator to modulate the randomized message, and a mapper to map the modulated message into OFDM tones for transmission by a power amplifier. Both the base stations and remote units have receivers to accept transmitted OFDM tones. Each receiver includes a de-mapper to de-map received OFDM tones into a modulated message, a demodulator to demodulate the modulated message into a randomized message, and a descrambler to de-randomize the message.

The base station and remote unit transmitters include a table with scrambling vectors organized in rows. The transmitter scramblers employ a selection algorithm to direct a pointer to a row in the scrambling vector table. Likewise, the communicating receiver in the base station or remote unit includes a descrambler with the same table, using the same selection algorithm to direct a pointer to the same row in the table.

The transmitters transmit the message of OFDM tones with respect to a system frame structure. Thus, the transmitted OFDM tones can be said to occupy a first position in a frame structure. The transmitter scrambler uses this known first position information to select the specific scrambling vector to randomize the data in the message. Likewise, the receivers receive OFDM tones in the first position of the frame structure, and the descrambler selection of the scrambling vector is responsive to the first position of the OFDM tones in the frame structure.

The scrambling vector tables are organized into rows of scrambling vectors, where each row of the table represents a scrambling vector of 16 bits. After the first 16 bits of the message, when the scrambling vector has reached the last bit in the table row, the pointer is incremented to the next row in the table, and the de/scrambling process continues until the end of the message.

DETAILED DESCRIPTION OF THE PREFERRED EMBODIMENT

The specific data randomization process presented in the invention has been tailored for use with the OFDM communication system described in provisional application No. 60/140,648, filed Jun. 23, 1999 and entitled "Method for High Speed Data Communications in a Personal Wireless Access Network". Highlights of the OFDM system will be represented below to help illustrate the present invention. However, it should be understood that these concepts are applicable to other systems which rely on random data streams for maximum efficiency.

Figure 1:
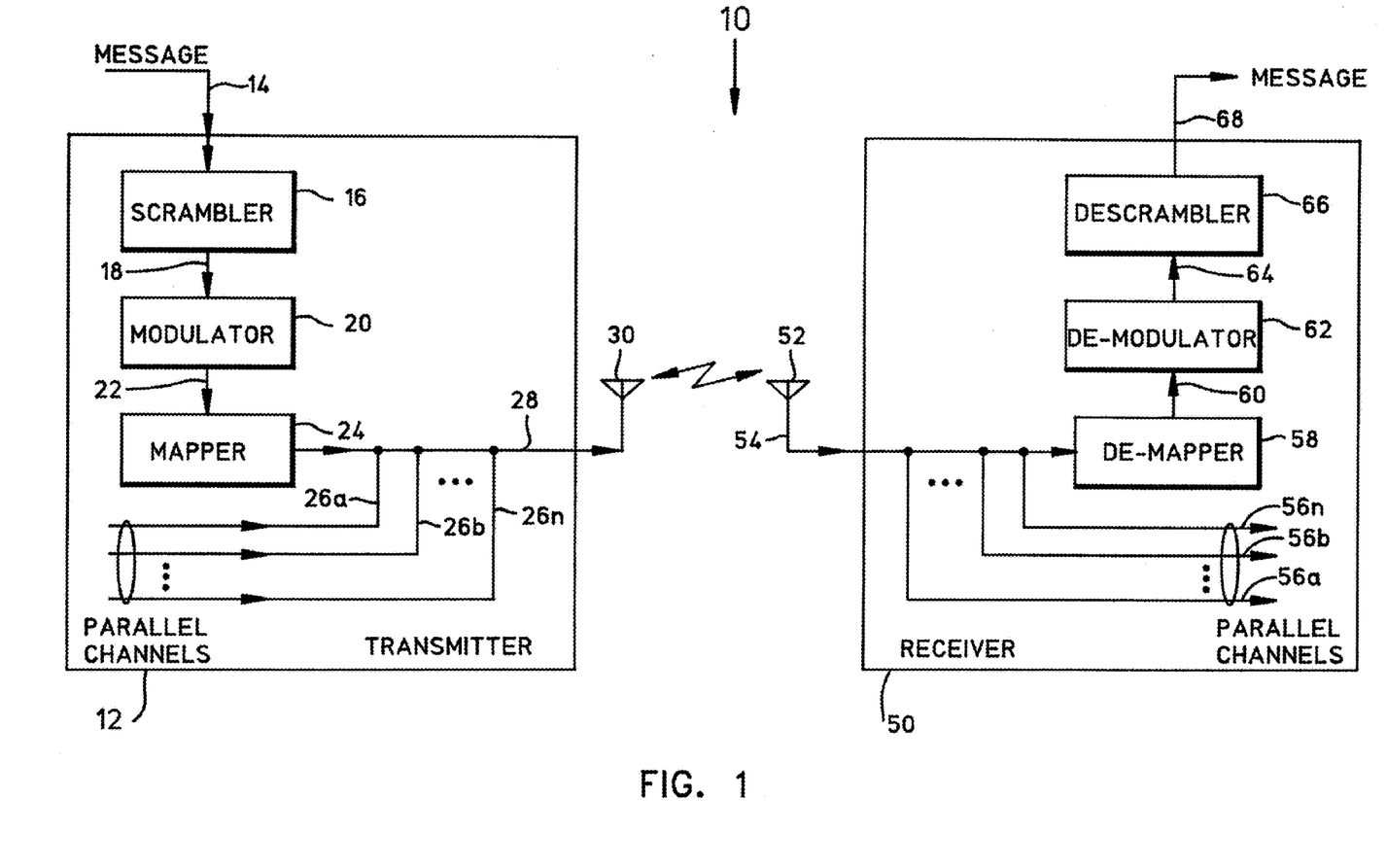
FIG. 1 is a schematic block diagram of the present inventive system for the communication of OFDM tones with minimized transmitted peak power levels.

FIG. 1 is a schematic block diagram of the present inventive system for the communication of OFDM tones with minimized transmitted peak power levels. The system 10 comprises at least one base station and at least one remote unit. Both the base stations and the remote units include transmitter and receiver sections. The transmitters and receiver sections of the base stations are essentially identical for the purpose of this invention. Practically, because of FCC peak power limitations, the remote units are more likely to transmit fewer OFDM tones simultaneously. However, for all intents and purposes, the description of the transmitter applies equally well to base station and remote unit transmitters, and the description of the receiver applies equally well to base station and remote unit receivers.

Transmitter 12 has a port which accepts a message on line 14 to a channel input. The message includes digital data which represents either a voice communication or digitally formatted information. One practical application for the present invention's data randomization process is for the transmission of large messages at high data rates. This form of data is more likely to include significant patterns of repetitious data.

Transmitter 12 includes a scrambler 16 to accept the message. As is explained in more detail below, scrambler 16 has an output on line 18 to provide a randomized pattern of digital data, or a randomized message, also called a scrambled message. Modulator 20 accepts the scrambled message and provides a modulated form of the scrambled message on line 22. QAM (quadrature amplitude modulation), PSK (phase-shift keying), and QPSK (quadrature PSK) modulation formats are particularly applicable; however, the invention is not limited to any specific modulation format. The modulated message is accepted by a mapper 24, which maps the modulated data into OFDM tones. It is at this stage of the process that the tone amplitudes and phases are assigned.

The exemplary OFDM system transmitter is capable of transmitting 288 tones simultaneously. There are 16 frequency bands, with 18 tones in each frequency band. However, the transmitter channel into which the message has been inserted may use any number of frequency bands at any one time for the transmission of the message. The remaining frequency bands are represented by lines 26*a*, 26*b*, and 26*n*. The sum of the tones in all the frequency bands are represented by line 28, which is connected to antenna 30. However, it should be understood that the success of the present invention is not limited by the number of frequency bands assigned to a channel, or how many time slots a message is spread across.

Receiver 50, whether it is a remote unit or base station receiver, operates to essentially reverse the modulation and scrambling to recover the message. Receiver 50 has an antenna 52 to accept the radiated signal from the transmitter 12. This signal on line 54 may carry OFDM tones relating to other channels connected on lines 56*a*, 56*b*, and 56*n*, where the channels on lines 26*a* and 56*a*, 26*b* and 56*b*, and 26*n* and 56*n* correspond, respectively. The message-bearing channel is accepted by de-mapper 58, which converts the amplitude and phase of the tones into a modulated digital signal on line 60. It is understood that the de-mapper 58 also includes a tone equalizer function. The demodulator 62 demodulates the message, using the same format as used by transmitter modulator 20. Then, the message is descrambled, or de-randomized, by descrambler 66, and the original message is output on line 68.

Figure 2:
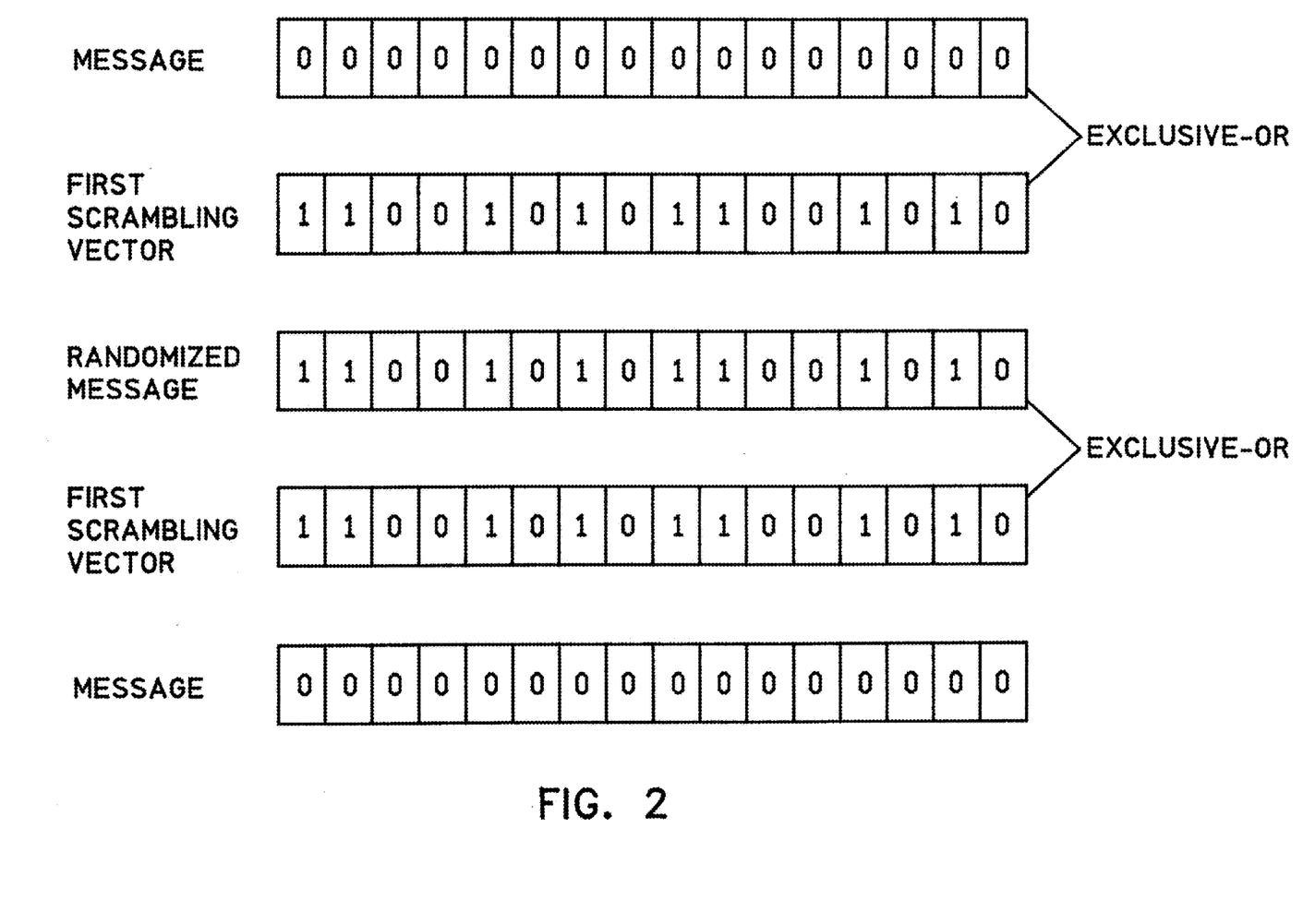
FIG. 2 illustrates the randomization process which scrambles digital data patterns in a message.

FIG. 2 illustrates the randomization process which scrambles digital data patterns in a message. To create a message with a random pattern of digital data, the message (with a non-random pattern of digital data, such as a series of "0"s or a series of "1"s) is combined with a scrambling vector. Many processes would be applicable, but the present invention is illustrated using an exclusive-or addition process, also referred to as modulo two addition. Every bit in the scrambling vector is added to a corresponding bit in the message, and the carries in the addition process are discarded. The result is most likely to be a message with a random pattern of digital data. As shown, a message including a series of "0"s is combined with a first scrambling vector. To recover the actual message from the randomized message, the first scrambling vector is removed from the randomized message. That is, the first scrambling vector is removed by another exclusive-or addition process to recover the original message. Note that the same vector must be used to unscramble as was used to originally scramble the message.

The present invention is not limited to any particular length of scrambling vector, or any particular number of scrambling vectors. In the exemplary OFDM system, the length of the scrambling vector has been chosen to have a length of 16 bits, as shown in FIG. 2. Most messages, however, are longer than 16 bits. To prevent the emergence of digital data patterns which may result from the continual reuse of the same scrambling vector, a plurality of scrambling vectors are used for the scrambling of digital data.

Figure 3:
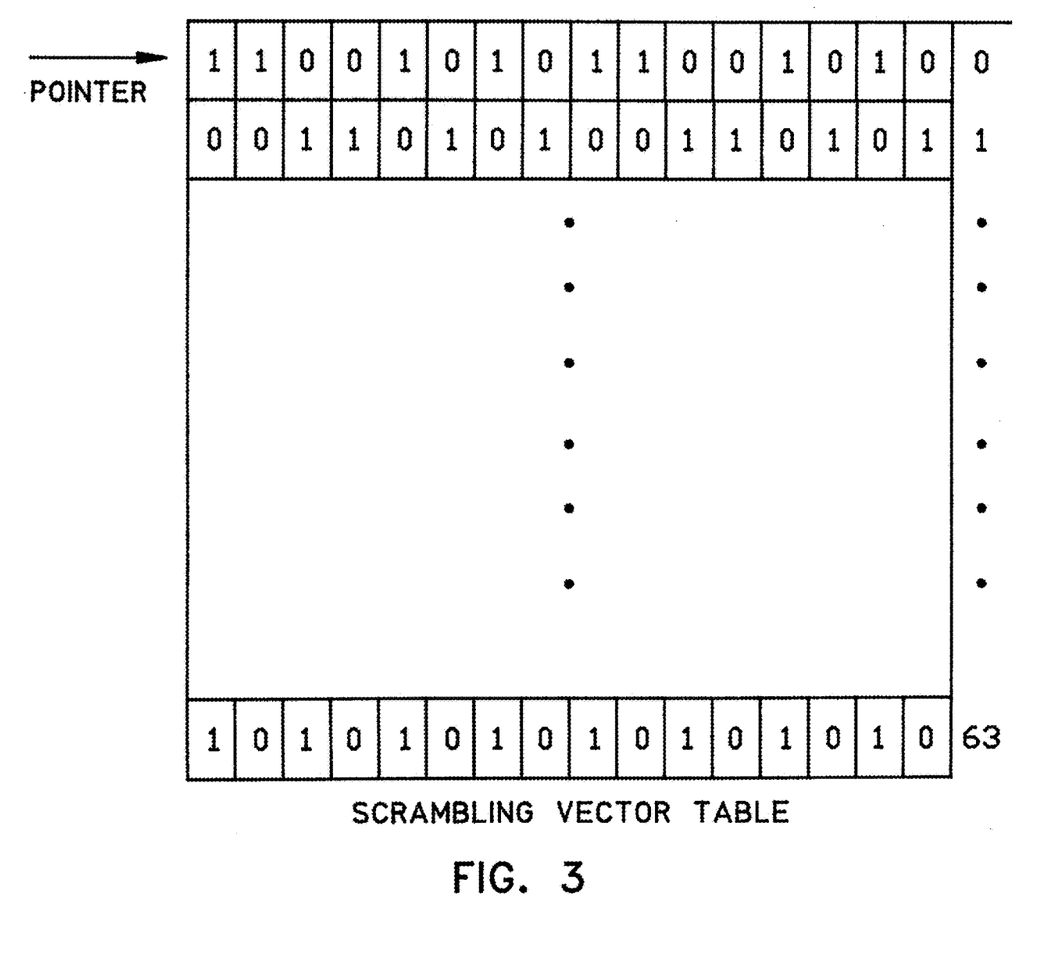
FIG. 3 illustrates a table of scrambling vectors that are used by both the scrambler of the transmitter, and the descrambler of the receiver (see FIG. 1).

FIG. 3 illustrates a table of scrambling vectors that are used by both the scrambler 16 of the transmitter 12 and the descrambler 66 of the receiver 50 (see FIG. 1). The table represents 64 rows of scrambling vectors, where each row in the table is occupied by a 16-bit scrambling vector. The first scrambling vector of FIG. 2 is shown occupying row number "0". Messages that are longer than 16 bits require the use of additional scrambling vectors to continue the scrambling process. It would be feasible to devise an algorithm which redirects the pointer after the completion of the row in which the first scrambling vector is located. Preferably, the present invention continues the scrambling process by automatically incrementing the pointer to the next row (Row 1). If the first scrambling vector happens to be in the last row of the table, the pointer automatically wraps around to select the first row in the table (Row 0) when the pointer is incremented.

The table can be in a read-only memory in the scrambler/descrambler 16/66, or stored in memory that is in communication with the scrambler/descrambler 16/66. Likewise, the table can be generated from mathematical formulae in software or other apparatus that generates predetermined pseudorandom numbers when the units are turned on, and then stored. Alternately, the scrambling vectors can be calculated from a formula as they are used. Although the invention is not specifically limited to a table of 64 rows, 64 rows of 16-bit scrambling vectors are needed to scramble all the data transmitted in a single time slot in the exemplary OFDM system, using each of the scrambling vectors only once.

Obviously, it is critical that a receiver select the same scrambling vector, or series of vectors, that is used by the transmitter to scramble the original message. Any one of a number of algorithms could be devised to direct the table pointers. The exemplary OFDM system directs the pointer with an algorithm, which is responsive to the position of the message in the communication frame structure. As explained in the provisional application Ser. No. 60/140,648, the basic unit of transmission in the OFDM system is the TDMA slot, which is 375 µs in duration. There are 288 information-bearing OFDM tones in a TDMA slot. These 288 tones are divided into 16 frequency slots (groups) of 18 tones each. When the 18 tones in the frequency slot are used for carrying digital data, 16 of the tones carry actual data using 16-QAM modulation. The other two tones are used as pilot tones for equalization purposes. A single tone modulated using 16-QAM modulation carries four bits of information. The sixteen information-bearing tones in a frequency slot, therefore, carry a total of 64 bits of information.

The TDMA slots are organized into a framing structure as follows. Eight TDMA slots constitute a TDMA frame of 3 ms in duration. A TDMA frame is also known as a NAC slot. Five NAC slots constitute a NAC frame of 15 ms in duration, also known as a BC slot. Thirty-two BC slots make up a BC frame of 480 ms in duration.

The formula used to direct the pointer is as follows:

$$\text{pointer}=[(\text{NACSlotNum}*16)+\text{BCSlot}+(\text{FreqSlotNum}*4)] \bmod 64$$

where NACSlotNum refers to the NAC slot number, BCSlot refers to the BC slot number, and FreqSlotNum refers to the frequency channel slot number.

Using the above formula, all of the scrambling table is used to scramble the data in each frequency slot differently. Another advantage of the above formula is that the scrambling vector used to scramble the data in a given frequency slot changes for each NAC slot and each BC slot. If the scrambling vector used in a first time slot does indeed cause a large peak in the time domain OFDM signal, causing it to be clipped by the power amplifier, then the data may not be recovered correctly by the receiver. In this case, the data is retransmitted in a second timeslot. The second time the data is transmitted, it is scrambled with a different scrambling vector, thus reducing the likelihood that a large peak will be present in the time domain OFDM signal in the second transmission.

Obviously, there are many other formulae that could be derived using the same framing system as described above. Other totally different systems could be used to direct the pointer, such as systems where the pointer is responsive to a system clock or a system where the base station directly commands the pointer position.

Figure 4:
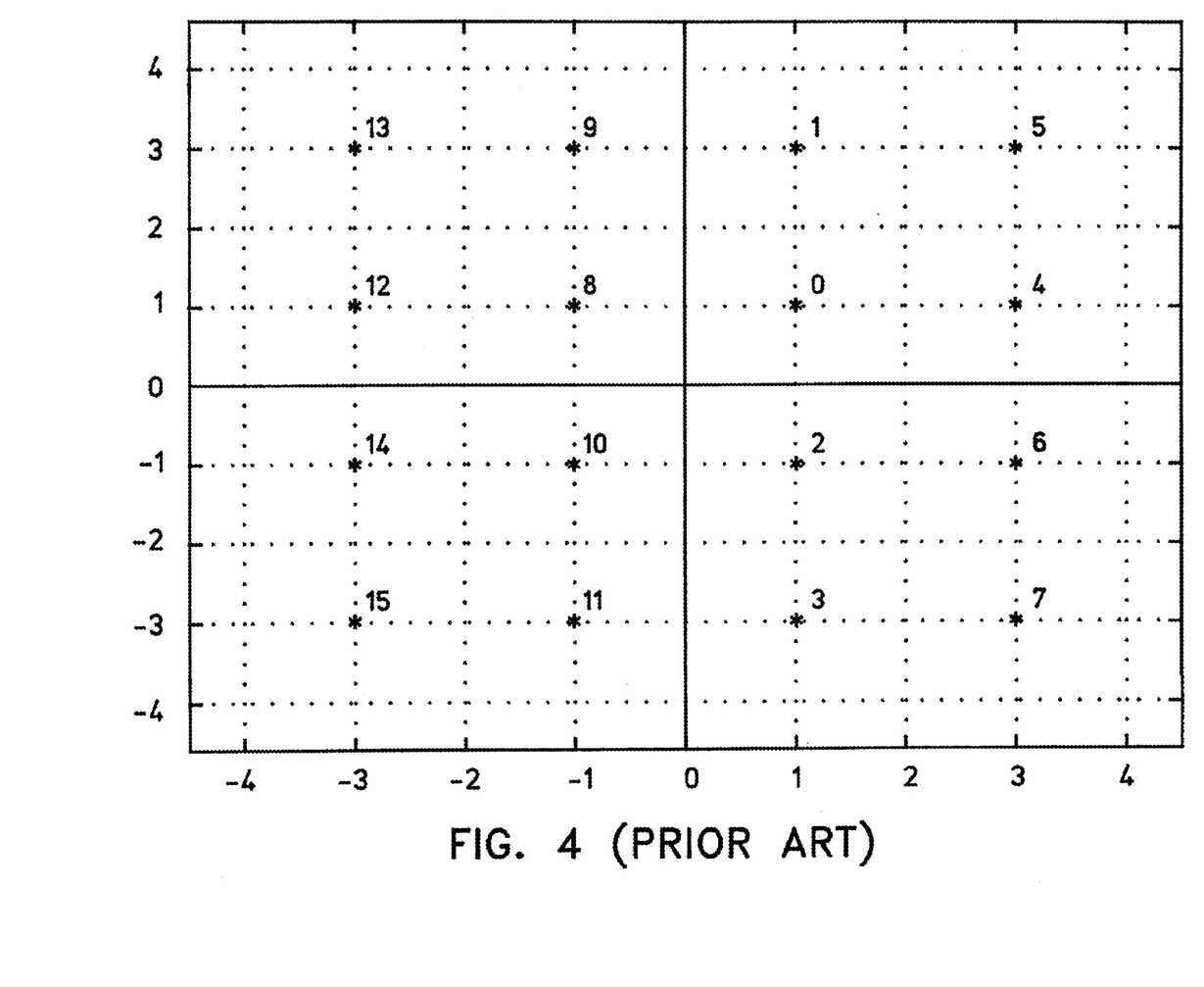
FIG. 4 is a 16-QAM constellation for encoding data using Gray Coding (prior art).

FIG. 4 is a 16-QAM constellation for encoding data using Gray Coding (prior art). The 16-QAM constellation and time domain plots of OFDM waveforms which follow are presented in order to clarify the advantages of scrambling digital data patterns.

Figure 5:
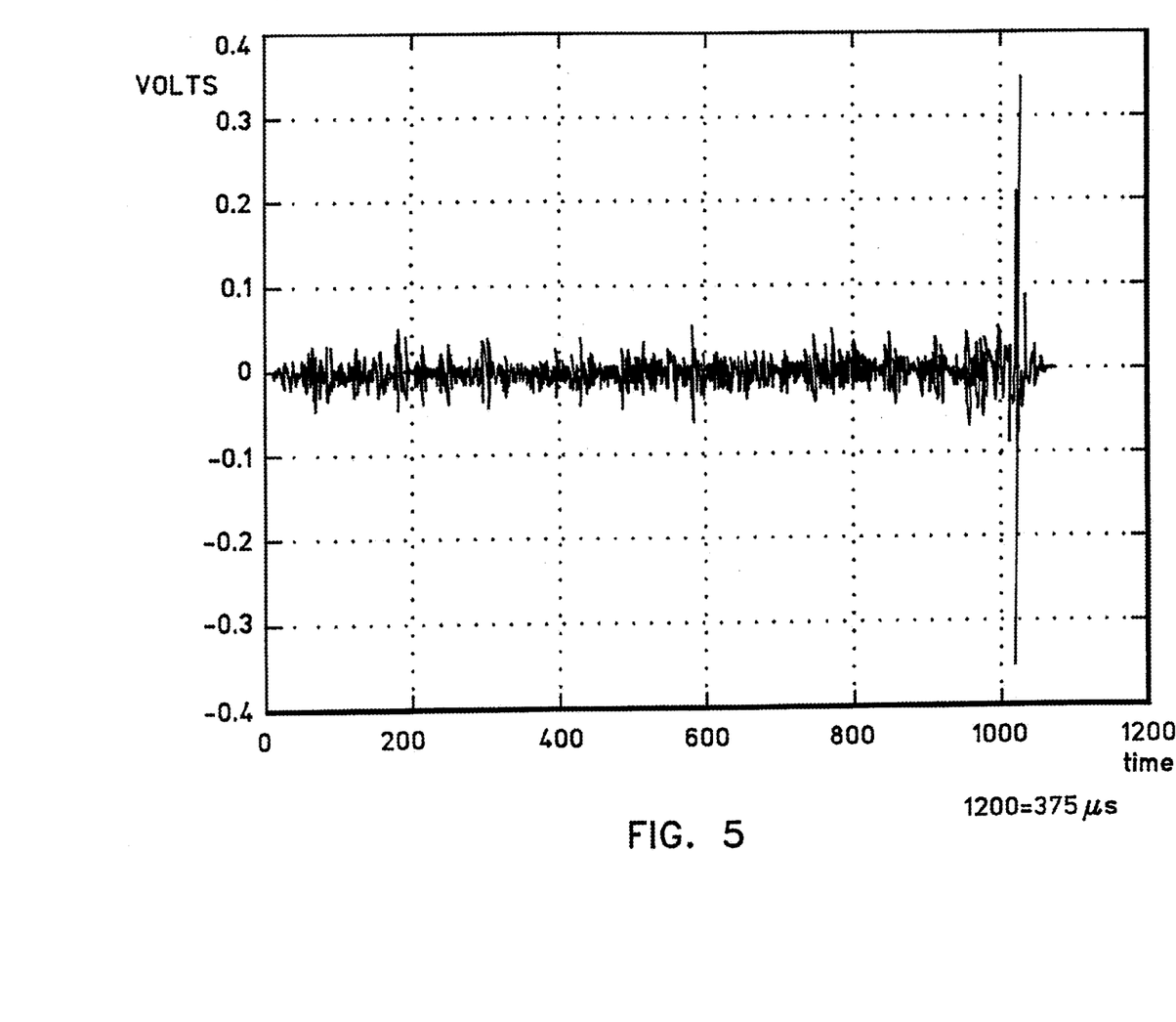
FIG. 5 illustrates an OFDM time domain waveform of 288 tones with no scrambling.

FIG. 5 illustrates an OFDM time domain waveform of 288 tones with no scrambling. The first 144 tones are selected from constellation point (−3, −3) (see FIG. 4). This constellation point represents the encoding of four binary ones. The other 144 tones are random data that have been modulated using 16-QAM. As can be seen in the FIG. 5, a large peak (22 dB peak to RMS ratio) is present in the time domain which corresponds to the pattern of ones.

Figure 6:
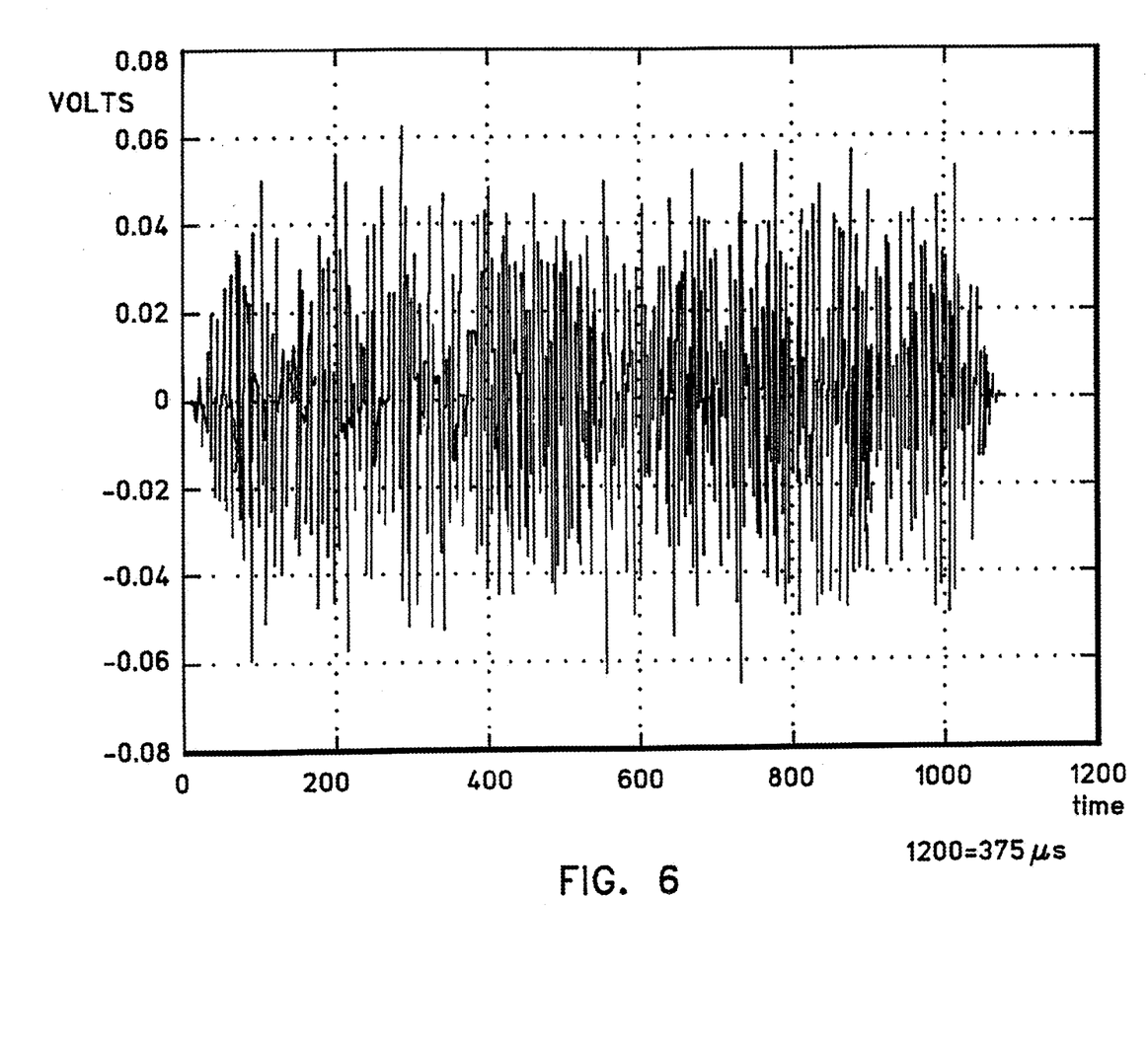
FIG. 6 illustrates an OFDM time domain waveform of 288 tones with scrambling.

FIG. 6 illustrates an OFDM time domain waveform of 288 tones with scrambling. Data randomly distributed in the 16-QAM constellation, with no long patterns of ones or zeros, is transmitted. The peak to RMS ratio is only 9.5 dB. A comparison of FIGS. 5 and 6 shows an improvement of over 10 dB peak to RMS power when the data is scrambled.

Figure 7:
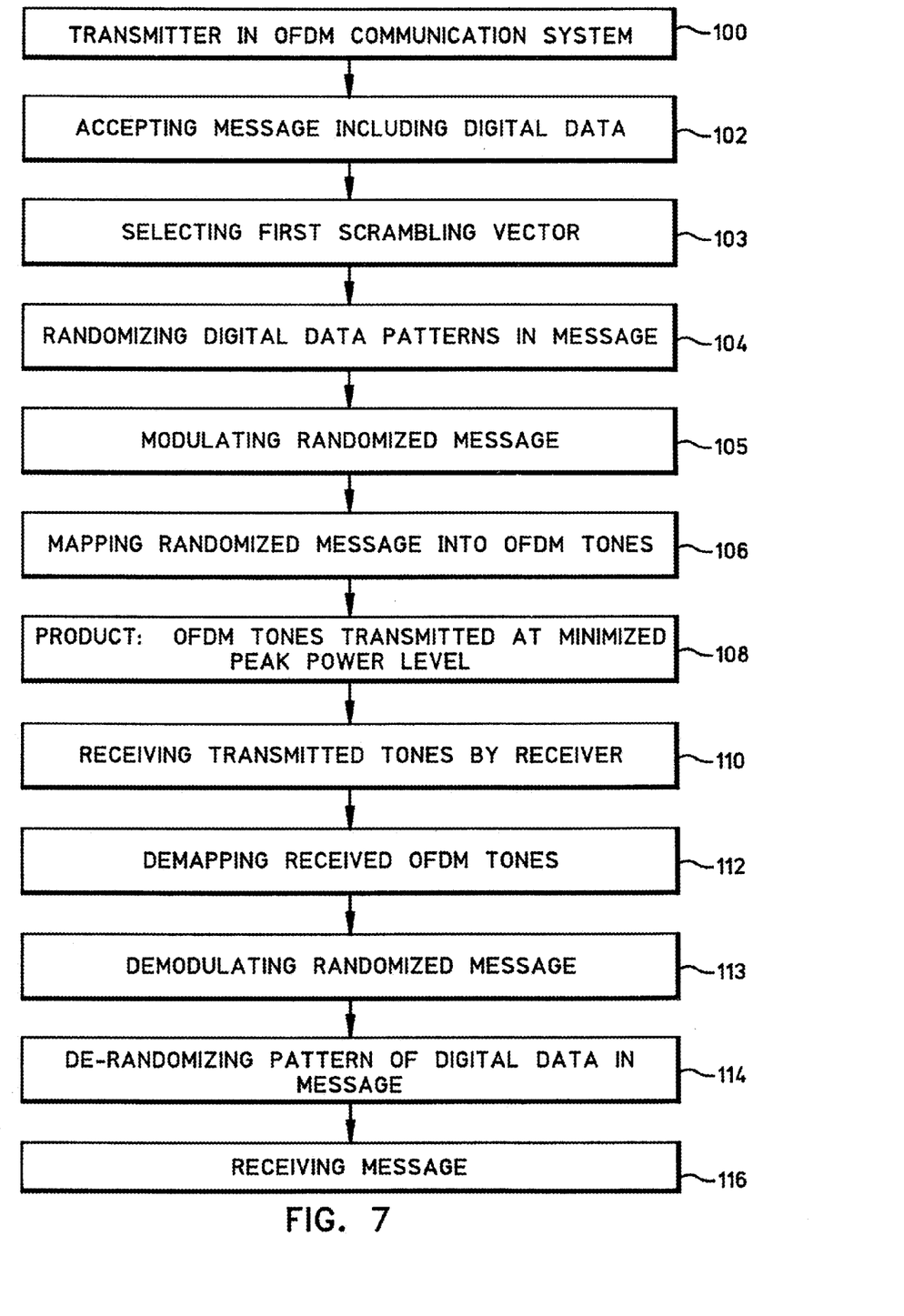
FIG. 7 is a flowchart illustrating a method for transmitting an OFDM waveform at a minimized peak power level.

FIG. 7 is a flowchart illustrating a method for transmitting an OFDM waveform at a minimized peak power level. Alternately stated, the flowchart represents a method for minimizing the peak voltage of the tones in an OFDM communication. Although the method is presented as a sequence of numbered steps for the purpose of clarity, no order should be inferred from the numbering unless explicitly stated. Step 100 starts with a transmitter in an OFDM communication system. In step 102, the transmitter accepts a message including digital data. The transmitter accepts a message which is selected from the group including voice communications and high speed data formats. Step 104 randomizes digital data patterns in the message, creating a randomized message. Step 106 maps the randomized message into OFDM tones. Step 108 is a product where the OFDM tones are transmitted at a minimized peak power level.

The OFDM system of step 100 also includes a receiver and in step 110 the receiver receives the transmitted OFDM tones. Step 112 de-maps the received OFDM tones into the randomized message. Step 114 de-randomizes the pattern of digital data in the message, and step 116 receives the message.

Preceding the mapping of the randomized message into OFDM tones, step 105 modulates the randomized message using a modulation format selected from the group including QPSK, PSK, and QAM modulation formats. Following the de-mapping of the received OFDM tones into the randomized message in step 112, step 113 demodulates the randomized message.

The randomization of the message in step 104 includes combining the digital data with a predetermined scrambling vector. Likewise, the de-randomization of the message in step 114 includes removing the scrambling vector from the message of digital data. Typically, the scrambling vector is a pseudo-random arrangement of digital data, and the combination of the digital data with the first scrambling vector in step 104 includes using an exclusive-or process to add the scrambling vector. Likewise, the removal of the scrambling vector from the digital data in step 114 includes using an exclusive-or process to add the scrambling vector.

In one aspect of the invention, a plurality of scrambling vectors are provided. Then, the method comprises further steps. Step 103 selects a first scrambling vector. Using the first scrambling vector, step 104 randomizes the pattern of digital data in the message. Likewise, using the first scrambling vector, step 114 de-randomizes the pattern of digital data in the message.

In some aspects of the invention, the transmitter includes a table with a first plurality of scrambling vectors arranged in a first plurality of rows, and the receiver includes a table with the first plurality of scrambling vectors arranged in a first plurality of rows. Then, the selection of the first scrambling vector for randomizing in step 103 includes using a selection algorithm to direct a pointer to a row in the scrambling vector table. Likewise, the selection of the first scrambling vector for de-randomizing in step 114 includes using the selection algorithm to direct a pointer to a row in the scrambling vector table.

Typically, the transmitter and the receiver use a common scrambling vector table. In some aspects of the invention step 108 includes the OFDM tones being transmitted in a first position in a frame structure. The selection algorithm used in steps 103 and 114 includes selecting a first row in the tables in response to the first position of the OFDM tones in the frame structure.

In some aspects of the invention, each row of the table includes a scrambling vector of 16 bits. When the acceptance of the message in step 102 includes receiving a message of at least 16 bits, then the selection of the scrambling vector in step 103 includes the pointer being automatically incremented to the next row in the table after the first row is used. Likewise, the de-randomization of the message in step 114 includes the pointer being automatically incremented to the next row in the table after the first row is used.

In some aspects of the invention, more than one message is being transmitted simultaneously, so that at least two messages require that their data be randomized. Then, the acceptance of a message in step 102 includes the transmitter accepting a second plurality of messages including digital data. The randomization of the message in step 104 includes randomizing the digital data patterns in a second plurality of messages. The mapping of the randomized message into OFDM tones in step 106 includes mapping the second plurality of randomized messages into OFDM tones. Likewise, the de-mapping of the received OFDM tones into the randomized message in step 112 includes the receiver de-mapping the OFDM tones into a second plurality of randomized messages. The de-randomizing of the message in step 114 includes de-randomizing the second plurality of messages, and the receiving of the message in step 116 includes receiving the second plurality of messages.

The system and method for randomizing digital data patterns described above is helpful in reducing degradations due to non-linearity, and for reducing power consumption in power amplifiers. An exemplary OFDM communication system was used to illustrate the workings of the invention, but the invention is not strictly limited to the OFDM system used in the descriptions. Other embodiments and variations to the invention will occur to those skilled in the art.

What is claimed is:

1. An apparatus comprising:
   a scrambler configured to generate scrambled digital data using a scrambling vector selected from a predetermined set of scrambling vectors;
   a modulator configured to generate modulated digital data at least partially based on the scrambled digital data;
   a mapper configured to map the modulated digital data into orthogonal frequency division multiplexed (OFDM) tones; and
   an antenna configured to transmit the OFDM tones over an air interface,
   wherein the scrambler is configured to select the scrambling vector from the predetermined set of scrambling vectors at least partially based on a Network Access Channel (NAC) slot number, a Broadcast Channel (BC) slot number, and a frequency channel (Freq) slot number.

2. The apparatus as recited in claim 1, wherein the scrambler is configured to determine a pointer to the predetermined set of scrambling vectors according to:

$$[(NACSlotNum \times N_1) + BCSlot + (FreqSlotNum \times N_2)] \mod N_3,$$

where $N_1$, $N_2$, and $N_3$ are predetermined integers.

3. The apparatus as recited in claim 2, wherein
$N_1$ is a number of data bearing tones per OFDM frequency slot,
$N_2$ is a number of bits of information per data bearing tone, and
$N_3$ is a number of scrambling vectors in the predetermined set of scrambling vectors.

4. The apparatus as recited in claim 1, wherein the scrambler is configured to determine a pointer to the predetermined set of scrambling vectors according to:

$$[(NACSlotNum \times 16) + BCSlot + (FreqSlotNum \times 4)] \mod 64.$$

5. The apparatus as recited in claim 1, wherein the predetermined set of scrambling vectors includes a plurality of pseudo-random digital data vectors.

6. The apparatus as recited in claim 1, wherein the predetermined set of scrambling vectors includes a scrambling table stored in memory.

7. The apparatus as recited in claim 1, wherein the predetermined set of scrambling vectors is partially generated from a formula as an individual scrambling vector is used.

8. The apparatus as recited in claim 1, further comprising:
a summer configured to combine the OFDM tones with additional OFDM tones based on additional digital data and provide combined OFDM tones to the antenna.

9. A method comprising:
scrambling digital data using a scrambling vector selected from a predetermined set of scrambling vectors, thereby generating scrambled digital data;
modulating the scrambled digital data, thereby generating modulated digital data;
mapping the modulated digital data into orthogonal frequency division multiplexed (OFDM) tones; and
transmitting the OFDM tones over an air interface.
wherein the scrambling includes selecting the scrambling vector from the predetermined set of scrambling vectors at least partially based on a Network Access Channel (NAC) slot number, a Broadcast Channel (BC) slot number, and a frequency channel (Freq) slot number.

10. The method as recited in claim 9, wherein the scrambling includes determining a pointer to the predetermined set of scrambling vectors according to:

$$[(NACSlotNum \times N_1) + BCSlot + (FreqSlotNum \times N_2)] \mod N_3,$$

where $N_1$, $N_2$, and $N_3$ are predetermined integers.

11. The method as recited in claim 10, wherein
$N_1$ is a number of data bearing tones per OFDM frequency slot,
$N_2$ is a number of bits of information per data bearing tone, and
$N_3$ is a number of scrambling vectors in the predetermined set of scrambling vectors.

12. The method as recited in claim 9, wherein the scrambling includes determining a pointer to the predetermined set of scrambling vectors according to:

$$[(NACSlotNum \times 16) + BCSlot + (FreqSlotNum \times 4)] \mod 64.$$

13. The method as recited in claim 9, wherein the predetermined set of scrambling vectors includes a plurality of pseudo-random digital data vectors.

14. The method as recited in claim 9, wherein the predetermined set of scrambling vectors includes a scrambling table stored in memory.

15. The method as recited in claim 9, wherein the predetermined set of scrambling vectors is partially generated from a formula as an individual scrambling vector is used.

16. The method as recited in claim 9, further comprising:
combining the OFDM tones with additional OFDM tones based on additional digital data prior to transmission.

* * * * *

UNITED STATES PATENT AND TRADEMARK OFFICE
CERTIFICATE OF CORRECTION

PATENT NO.        : 8,014,272 B2                                               Page 1 of 1
APPLICATION NO.   : 12/419392
DATED             : September 6, 2011
INVENTOR(S)       : Garcia, Jr. et al.

It is certified that error appears in the above-identified patent and that said Letters Patent is hereby corrected as shown below:

Col. 10, line 3, please replace "interface." with --interface,--

Signed and Sealed this
Twenty-second Day of November, 2011

David J. Kappos
*Director of the United States Patent and Trademark Office*